US009274798B2

(12) United States Patent
Burnett (10) Patent No.: US 9,274,798 B2
(45) Date of Patent: Mar. 1, 2016

(54) MULTI-THREADED LOGGING (71) Applicant: Morgan Stanley, New York, NY (US)

(72) Inventor: Robert Graeme Burnett, St Albans (GB)

(73) Assignee: Morgan Stanley, New York, NY (US)

(*) Notice: Subject to any disclaimer, the term of this patent is extended or adjusted under 35 U.S.C. 154(b) by 289 days.

(21) Appl. No.: 13/745,173

(22) Filed: Jan. 18, 2013

(65) Prior Publication Data

US 2014/0208083 A1 Jul. 24, 2014

(51) Int. Cl.
G06F 9/30 (2006.01)
G06F 9/38 (2006.01)
G06F 11/36 (2006.01)
G06F 9/52 (2006.01)
G06F 11/07 (2006.01)

(52) U.S. Cl.
CPC ........ *G06F 9/38* (2013.01); *G06F 9/526* (2013.01); *G06F 11/3636* (2013.01); *G06F 11/0775* (2013.01)

(58) Field of Classification Search
None
See application file for complete search history.

(56) References Cited

U.S. PATENT DOCUMENTS

| 7,346,895 | B2 | 3/2008 | Yang | |
|---|---|---|---|---|
| 7,370,171 | B1 | 5/2008 | Jeyaram | |
| 2010/0106734 | A1* | 4/2010 | Calder et al. | 707/758 |

FOREIGN PATENT DOCUMENTS

WO WO 2014/113688 A1 7/2014

OTHER PUBLICATIONS

Kristofferson, Jan, "Atomic operations with multi-threaded environments," Oct. 21, 2002, printed from http://www.open-std.org/jtc1/sc22/wg21/docs/papers/2002/n1401.pdf on Jan. 18, 2013.
Mishra, Subal, "Illustrates the use of the lock in multithreading application," C# Corner, Aug. 17, 2006, printed from http://www.c-sharpcorner.com/UploadFile/esubal/Lock08152006150641PM/Lock.aspx on Jan. 18, 2013.
"Gcc optimisation: __builtin_expect," Open Source Technical Blog, posted Aug. 6, 2006, printed from http://techblog.zabuchy.net/2006/gcc-optimisation-__builtin_expect/ on Jan. 18, 2013.
Tanenbaum, A.S., "Modern Operating Systems," Prentice Hall, Englewood Cliffs, NJ, 1992, pp. 33-61.
International Search Report, Application No. PCT/US2014/012071, dated Mar. 24, 2014 (4 pages).
Written Opinion, Application No. PCT/US2014/012071, dated Mar. 24, 2014 (6 pages).

(Continued)

*Primary Examiner* — Scott Sun
(74) *Attorney, Agent, or Firm* — K&L Gates LLP (57) ABSTRACT

A data slot may be reserved for a first thread selected from a plurality of threads executed by a computer system. A memory of the computer system may comprise a plurality of log files and a next free data slot pointer. Each log file may comprise a plurality of data slots and each of the data slots may be of a common size. Reserving the data slot for the first thread may comprise attempting to perform a first atomic operation to write to a first data slot pointed to by a current value of the next free data slot pointer an indication that the first data slot is filled. If the first atomic operation is successful, the computer system may update the next free data slot pointer to point to a second data slot positioned sequentially after the first data slot. If the first atomic operation is unsuccessful, the computer system may analyze the second data slot.

20 Claims, 8 Drawing Sheets

(56) References Cited

OTHER PUBLICATIONS

International Preliminary Report on Patentability, Application No. PCT/US2014/012071, dated Jul. 21, 2015 (7 pages).

Anonymous, "Logging in multi-threaded applications efficiently with ring buffer," retrieved from the internet at http://www.ibm.com/developerworks/aix/library/au-buffer/ on Oct. 8, 2015, 5 pages.

* cited by examiner

MULTI-THREADED LOGGING

BACKGROUND

Many types of computing applications utilize logging functionality to save data during execution, often to create a record of the application activities. Resulting logs are used to derive information about the execution of the application, information about tasks performed by the application during execution, etc. Logging functionality is used in many different contexts and for many different purposes. For example, logging functionality is often used to de-bug and/or troubleshoot various applications and/or systems. In the context of many business applications, including financial service applications, logging functionality is used to track transactions executed by and/or through the applications. The resulting logs are then used to perform audits, troubleshoot account problems, verify inventory status, demonstrate compliance with applicable regulations, etc.

In many cases, logging functionality is implemented in a multi-thread environment where more than one thread records its activities at a common log location. Multi-thread environments can increase the speed at which application tasks are performed. One example use case involves high frequency securities trading, in which multiple threads are executed with each thread implementing trades determined according to a trading algorithm. The use of multiple threads allows the trades to be implemented faster, thus increasing the efficacy of the trading algorithms. Another example use case for multi-thread and/or multi-application logging is in the context of an operating system where multiple services maintain a common system log.

Logging in a multi-thread and/or multi-application environment requires certain safeguards to prevent different threads or applications from over-writing the others' records. These safeguards are typically implemented as locks or other operating system-level mechanisms. For example, a thread that needs to write to the log must first obtain a lock associated with the log. If the lock is unavailable (e.g., another thread has the lock), the first thread may not write to the log until the lock is released. Although locks can be effective at preventing overwrite, they demonstrate weakness in applications where execution speed is important, such as high frequency securities trading applications. Calls to the operating system to obtain and/or release locks are computationally expensive and time consuming. Also, when a lock required by a thread is unavailable, the thread may not be able to continue its processing until the lock is available, thus slowing overall execution. In some cases where thread execution speed is important, it is known to create logs after execution by analyzing communication messages generated by the threads. For example, high frequency securities trading application threads generate messages requesting the execution of trades. Details of the trades can be extracted by analyzing data packets making up the messages. Analysis of the data packets, however, is also computationally expensive. The packets must be parsed according to their specific transport-layer protocol. Payload data describing the trade or other transaction must then be extracted and properly placed relative to other payload data. Improvements to multi-threaded logging are desired.

SUMMARY

In one general aspect, the present invention is directed to systems and methods for maintaining logs for use by multiple threads. For example, a data slot may be reserved for a first thread executed by a computer system. A memory of the computer system may comprise a plurality of log files and a next free data slot pointer. Each log file may comprise a plurality of data slots and each of the data slots may be of a common size. Reserving the data slot for the first thread may comprise attempting to perform a first atomic operation to write to a first data slot pointed to by a current value of the next free data slot pointer an indication that the first data slot is filled. If the first atomic operation is successful, the computer system may update the next free data slot pointer to point to a second data slot positioned sequentially after the first data slot. If the first atomic operation is unsuccessful, the computer system may analyze the second data slot.

FIGURES

Various embodiments of the present invention are described herein by way of example in conjunction with the following figures, wherein.

DESCRIPTION

Various embodiments of the present invention are directed to systems and methods for facilitating multi-thread logging, including high-speed multi-threaded logging. A set of linked log files may be stored at a computer system memory. Each log file may define a plurality of data slots of a predefined size. In some embodiments, each log file is memory-mapped to a kernel space location in system memory. The computer system memory may also comprise a log file pointer variable and a next free data slot pointer. The log file pointer may point to a current log file or an indication of a current log file. As the log files are linked or sequential, the current log file may be compared to a set of previously-prepared log files to determine how many free log files remain in the linked set. The next free data slot pointer may point to the next data slot within one of the set of log files that is available to be written.

The computer system may execute a plurality of threads, with each thread writing to the set of log files. A thread may be a process executed by a computer system. In some embodiments, multiple threads are executed as part of a common application. In some embodiments, different threads may refer to different applications and/or processes executed on the same processor, on different cores of the same processor, on different processors, etc. When a thread reaches a point in its processing where it is to write to the set of log files, it may call a logging function. In various embodiments, the logging function reserves a data slot and returns to the thread a reserved data slot pointer pointing to a reserved data slot. The logging function may be called by any of the plurality of threads. Accordingly, in various embodiments, the logging function comprises functionality for preventing race conditions (e.g., conditions where more than one thread attempts to write to the same data slot at the same time). It will be appreciated that what is referred to herein as a logging function need not be a distinct callable function. For example, in some embodiments, the functionality of the logging function is implemented as a part of the one or more threads.

When called or otherwise executed by a thread, the logging function may determine whether the current log file is full (e.g., lacks free data slots). In some embodiments, this may be accomplished by examining the next free data slot pointer. For example, if the current log file is full, the next free data slot pointer may point to a location that is equal to or greater than the end of the log file. If the current log file is full, the logging function may update the next free data slot pointer to point to a data slot at the next log file in the linked set of log files (e.g., a first available data slot). If the log file is full, the logging function may also manipulate a log file pointer that may be stored at and/or point to a log file control block. The log file control block may include a linked list of generated log files. The log file pointer may point to the current log file. Accordingly, when the current log file is full, the logging function may modify the log file pointer to point to the next log file in physical memory and or an indication of the next log file at the log file control block. The position of the log file pointer in conjunction with the log file control block may indicate how many previously-prepared log files are still available. Upon determining whether the current log file is full (and switching to the new log file, if necessary), the logging function may determine whether the data slot pointed to by the next free data slot pointer is filled. If the data slot is filled, the logging function may examine the next data slot. If the data slot is not filled, the logging function may mark the data slot as filled, increment the next free data slot pointer, and return to the thread a reserved data slot pointer pointing to the un-filled data slot. The thread may then write to the data slot.

As multiple threads may call the logging function or similar functionality at the same time, operations by the logging function affecting system variables may be implemented as atomic operations. System variables may be any variables that are accessible to more than one thread or other process. Examples of system variables include the next free data slot pointer, the log file pointer, the status fields of various data slots, etc. An atomic operation may be an operation that is guaranteed to succeed or fail without interference from other threads or operations executed by the computer system. For example, the logging function may utilize an atomic compare and set function (CAS) to update the status field of a log file data slot from free to filled. The computer system may compare the value of the status field to a value indicating that the data slot is free. If the data slot is free, the computer system may update the value to indicate that the data slot is filled. If the data slot is not free, the CAS function may fail. Because the CAS function is atomic, no other threads or other instances of the logging function may be able to modify the value of the data slot status field before the first logging function either reserves the data slot or learns that it is full.

In various embodiments, additional logging speed may be obtained by utilizing buitin_expect( ) operations (e.g., built-in_expect( )). When a piece of source code includes a conditional action (e.g., if A, then B, else C), a compiler typically generates object code that causes an executing computer system to prepare to execute all of the conditional branches (e.g., operations B and C in this example). For example, code for executing all of the conditional branches is loaded to cache memory and/or to a processor register. This prepares the computer system to quickly execute which ever conditional branch is ultimately selected. The processor time and resources used to cache code for executing the un-selected conditional branches, however, is wasted. According to a buitin_expect( ) operation, the expected outcome of the conditional action is indicated. The compiler generates object code that causes the executing computer system to prepare for execution of only the expected conditional branch. This increases execution speed when the expected outcome is correct, but reduces execution speed when the expected outcome is incorrect. As described, certain conditional actions of the logging function and/or other functionality described herein may be very likely to have a particular result. For example, most of the times that a logging function checks the status of a log file, the log file will not be full. Also, for example, most of the time that a log file checks the status of a log file data slot, the data slot will not be filled. Accordingly, these types of conditional actions may be executed with buitin_expect( ) operations.

Various embodiments of the systems and methods described herein exhibit advantages in any kind of multi-threaded logging application including, for example, high frequency trading of securities or other instruments. For example, various embodiments described herein exhibit O(1) performance. In other words, the amount of time required for each logging operation may be the same, regardless of the amount of data to be logged. For example, because each data slot (and, when applicable, each data slot payload location) may be of a constant size, the length of time for each write operation may be the same. Also, various embodiments described herein avoid race conditions, even in a multi-threaded environment and without the use of locks. Also, various embodiments described herein exhibit superior persistence. For example, log files that are memory-mapped to kernel space or a kernel managed file buffer may be maintained by the kernel (e.g., kernel I/O daemons) and transferred to persistent storage upon a system failure (e.g., due to an application crash, a system crash, a power failure in a battery backed-up environment, etc.). Various embodiments described herein also exhibit superior logging speed. For example, on a desktop-grade machine utilizing the features described herein, a single log write may take approximately 133 nanoseconds, which equates to 7.9 million transactions per second. An example of such a desktop-grade machine may utilize, for example, an INTEL XEON E3-1280 3.5 8 MB 4 95W N/A processor, an INTEL C206 chipset, four memory slots with up to 32 GB, DDR3 ECC memory, 8 GB DDR3 nECC memory at 1600 MHz. It may comprise a 300 GB StorageSATA Solid State Drive, and may comprise four slots with 1 MXM (Pclex16) and 3 miniPCle (Pcle2x1).

Figure 1:
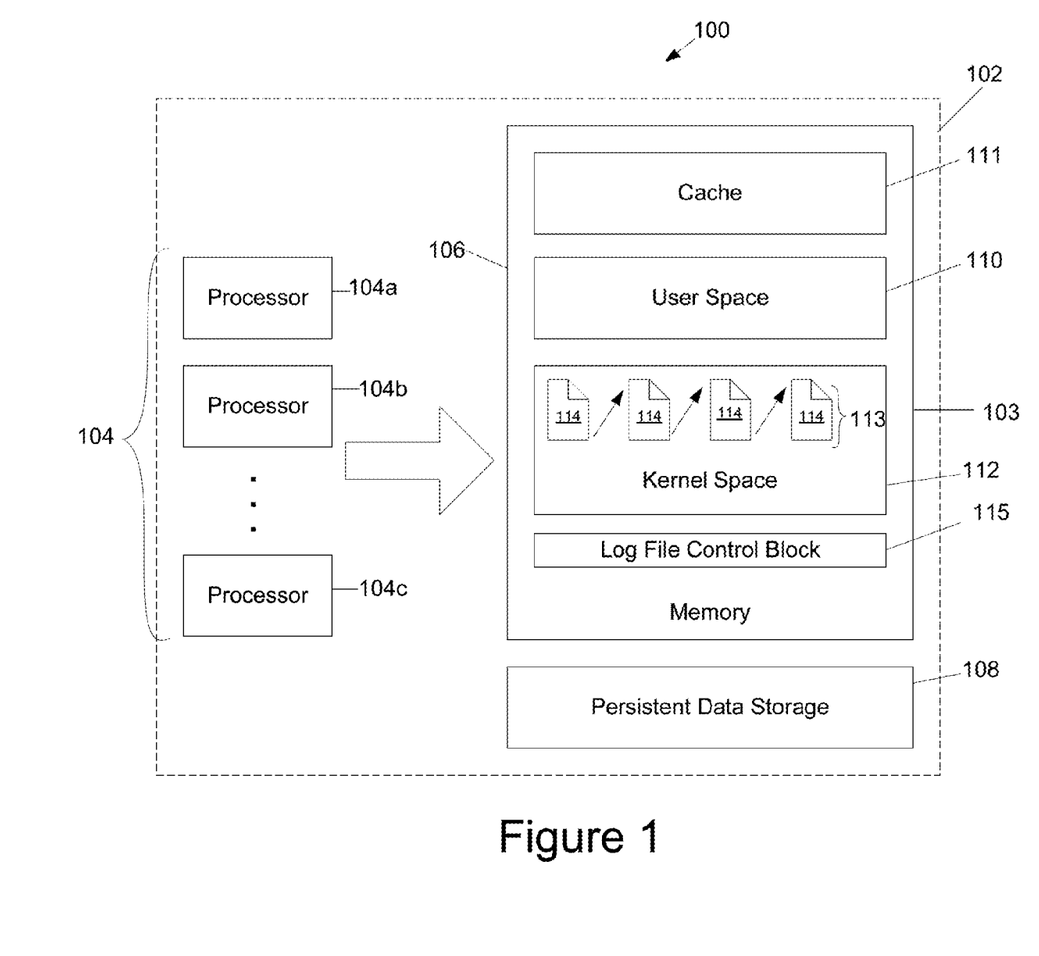
FIG. 1 is a block diagram showing one embodiment of an environment that may implement the logging systems and methods described herein.

FIG. 1 is a block diagram showing one embodiment of an environment 100 that may implement the logging systems and methods described herein. The environment 100 comprises a computer system 102. The computer system 102 comprises at least one processor 104. The processor 104 may be a single core processor or may include multiple cores (104a, 104b, 104c, etc.). Each core 104a, 104b, 104c may execute at least one process thread. In embodiment including multiple cores, the various cores 104a, 104b, 104c, etc. may be in communication with one another via one or more busses or via any other suitable manner. For example, the cores 104a, 104b, 104c, etc. may be in communication with one another via a point to point processor interconnect such as a front-side bus, a Quick Path Interconnect or QPI link available from INTEL CORPORATION, etc.

In embodiments comprising multiple processors, each processor may execute at least one process thread. The illustrated processor 104 may be in communication with memory 103 and persistent data storage 108. The memory 103, for example, may comprise any suitable type of data storage including, for example, random access memory (RAM). In some embodiments, the memory 103 is referred to as primary computer storage. Persistent data storage 108 may comprise any type of data storage that is maintained after power to the computer system 102 is removed. For example, persistent data storage may comprise any sort of disk drive, array of disk drives, flash drive, or any other type of secondary computer storage.

In various embodiments, the memory 103 is divided (e.g., by an operating system of the computer system 102) into user space 110 and kernel space 112. User space 110 may comprise memory locations that are generally available to non-operating system applications and threads. Kernel space 112 may comprise memory locations that are typically associated with the operating system kernel. In various embodiments, a set 113 of linked log files 114 is stored in kernel space. In such embodiments, an operating system kernel of the computer system 102 (e.g., input/output daemons associated with the kernel) may be configured to save the set 113 of linked log files 114 to persistent data storage 118 upon a failure of the computer system, for example, due to a program or operating system crash, power loss, etc. Kernel space 112 (and/or the portion of kernel space including the set 113 of linked log files 114) may also be referred to in some contexts as a kernel memory buffer or a kernel managed file buffer. The set 113 of linked log files 114 may be written to kernel space 112 using any suitable mechanism. In some embodiments, one or more of the linked log files 114 is written to kernel space as a memory mapped file.

In some embodiments, described herein, the memory 103 may also comprise cache memory 111. Cache memory 111 may be memory that is quickly accessible by the processor(s) 104. In some embodiments, cache 111 is implemented on a CPU die separate from other memory 103. Also, in some embodiments, the cache memory 111 is divided into three caches, L1, L2 and L3. The L1 cache may be used to store machine instructions (e.g., between retrieval of the instructions from another location in memory 103 or persistent storage 108 and execution). The L2 cache may be used to store program data utilized by one or more of the processor cores 104a, 104b, 104c, etc. The L3 cache may be utilized to store shared data between the cores. In some embodiments, the L3 cache comprises a physical copy of each of the processor cores 104a, 104b, 104c, etc.

The memory 103 may also comprise a log file control block 115. The log file control block 115 may be created and modified, as described herein, to track the status of the set 113 of linked log files 114. For example, linking between the log files 114 may be accomplished utilizing the log file control block 115. The log file control block 115 may be stored in any suitable portion of memory 103 including, for example, at user space 110, kernel space 112, cache 111, etc. In some embodiments, the log file control block 115 may be stored at persistent data storage 108.

Figure 2:
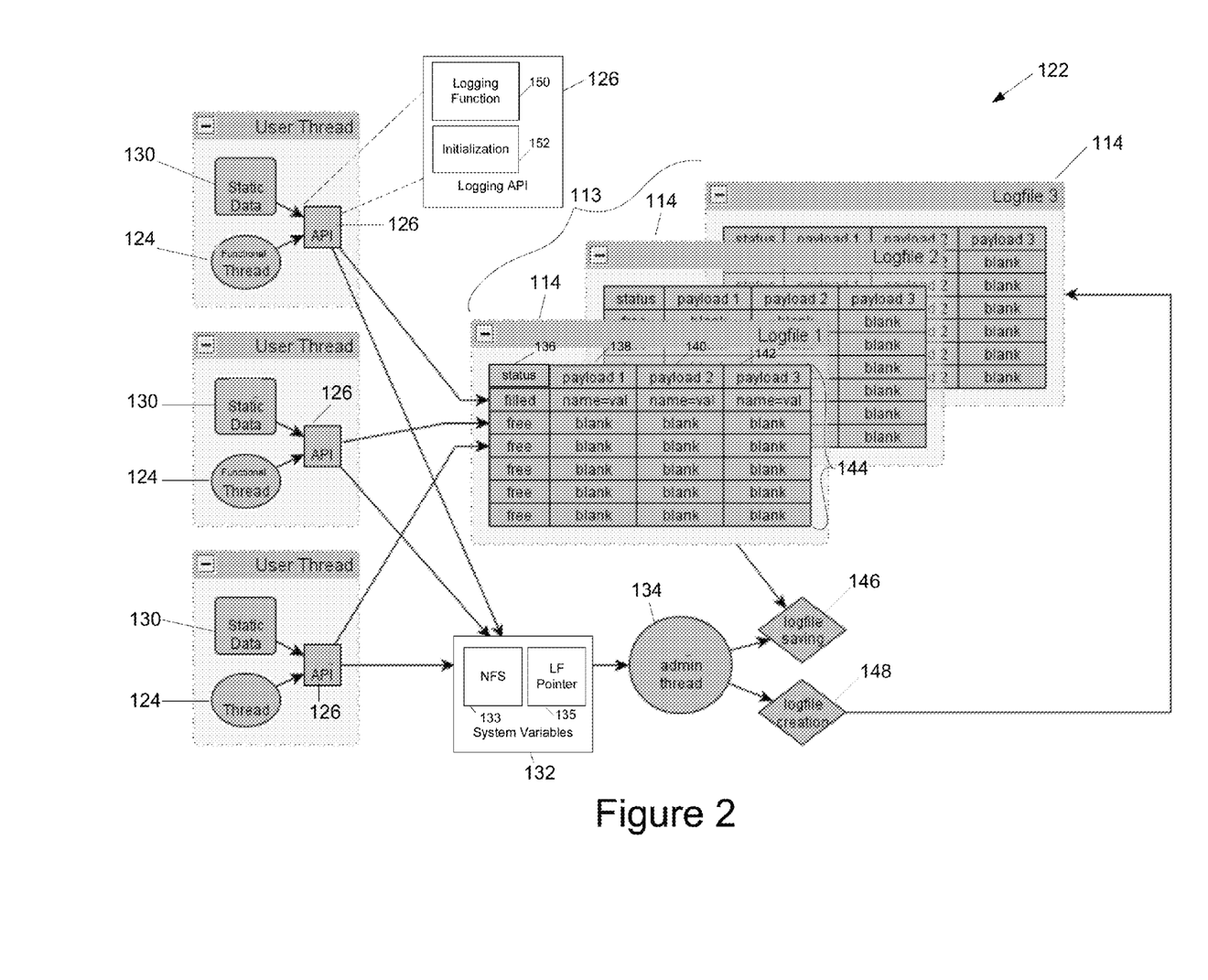
FIG. 2 is a block diagram illustrating one embodiment of a functional environment for implementing the logging systems and methods described herein.

FIG. 2 is a block diagram illustrating one embodiment of a functional environment 122 for implementing the logging systems and methods described herein. The environment 122 comprises a plurality of user threads 124, the system variables 132, an administrative thread 134 and the set 113 of linked log files 114. In some embodiments, each of the log files 114 comprises a plurality of data slots 144. Each data slot 144 may be configured to receive data from a single log write from a thread 124. In some embodiments, the log files 114 may have a fixed size. For example, when the log files 114 are memory-mapped files (e.g., memory-mapped to kernel space 112), the files 114 may have a predefined number of data slots 114 with each data slot having a predefined data slot size, which may be manifested as a common (e.g., predefined) number of data fields with each field having a predefined size. In the example illustrated in FIG. 2, each data slot 144 comprises four data fields. A status field 136 indicates the status of each data slot 144. The status of a data slot 144 may be filled, indicating that the data slot 144 is either filled or reserved to be filed by a thread 124. Alternatively, the status of a data slot 144 may be free, indicating that the data slot is available to be filled by a thread 124.

FIG. 2 also illustrates various other functional components of the logging systems and methods described herein. An administrative thread 134 may manage the set 113 of linked log files 114. For example, as described above, the log files 114 may be of a fixed length and may be memory-mapped to kernel space 112. When a log file 114 is filled, the administrative thread 134 may, at 146, cause the log file 114 to be copied from kernel space 112 to persistent storage 108. For example, the administrative thread 134 may close the log file 114, causing the kernel to subsequently copy the log file 114 to persistent storage 108 (e.g., via an asynchronous input/output (AIO)). In some embodiments, the administrative thread 134 may also, at 148, generate new log files 114 to replace those that are filled. System variables 132 may include variables that are utilized by multiple different threads 124 and/or functions called by multiple different threads. Example system variables include the next free data slot pointer 133 and the log file pointer 135 described herein. In some embodiments, the log file control block 115 may also be considered a system variable 132. The system variables 132 may be stored at any suitable location within memory 103. In some embodiments, the system variables 132 are also stored in the kernel space 112, for example, at a memory-mapped location. In this way, the system variables 132 may also be automatically stored to persistent storage 108 by the operating system kernel upon system failure.

Referring now to the user threads 124, each thread 124 may be executed by one or more of the processors 104 described herein above. Each thread 124 may perform a processing task. In the course of performing its processing task, each thread 124 may generate data 130 to be logged. The data 130 may be generated based on static data labels generated at startup. In some embodiments, data 130 generated using static data labels may be stored at L2 cache and/or at the registers of the processors 104, thereby expediting execution. The data 130 may be any suitable type of data. For example, in the context of high frequency securities trading, each thread 124 is configured to execute all or part of trading algorithm and may request certain trades. Records of the requested trades may make up all or a part of each thread's data 130 to be logged.

The threads 124 may utilize a logging application program interface (API) 126 to log the data 130, as described herein. The API 126 may provide the thread 124 with one or more function calls for logging the data. For example, the API 126 may comprise a logging function 150. The thread 124 may call the logging function 150 to facilitate logging of the data 130. When called, the logging function 150 may reserve and return to the calling thread 124 a reserved data slot pointer pointing to a data slot 144 to which the thread 124 may write its data 130. An initialization function 152 may also be a component of the API 126 and may be utilized to generate the environment 122. Instances of the logging function 150 and the initialization function 152 may be called by any thread 124 and may be executed by any of the processors 104 described above. In some embodiments, the environment 102 may implement a guard to prevent repeated invocation of the initialization function 152. For example, a main thread 124 may initialize the logging mechanism (e.g., call the initialization function 152) before any other of the thread 124 are created.

Figure 3:
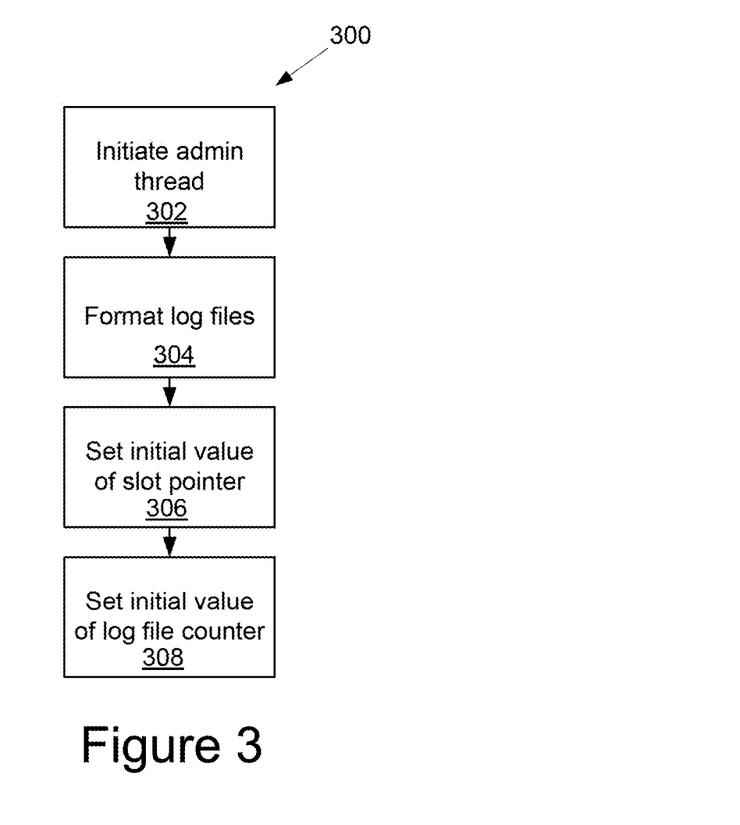
FIG. 3 is flow chart illustrating one embodiment of a process flow that may be executed by an initialization function to initialize the environment.

FIG. 3 is flow chart illustrating one embodiment of a process flow 300 that may be executed by an initialization function 152 to initialize the environment 200. It will be appreciated that the actions described with respect to the process flows described herein, including the process flow 300, may be executed in any suitable order. For example, at 302, the initialization function 152 may initiate an administrative thread 134. The administrative thread 134 may execute, as described herein and in additional detail in conjunction with 7. At 304, the initialization function 152 may format the set 113 of linked log files 114 as described herein. In some embodiments, the initialization function 152 prepares the log files 114 in a user configurable directory that can be changed dynamically without stopping program execution, which may enable continuous operation. When a log file 114 is prepared, it may be mapped into memory (e.g., kernel space 112). For example, all of the pages of the log file 114 may be pre-faulted, which may reserve system memory in the kernel space 112. In some embodiments, the initialization function 152 may also link the log files 114. For example, the base and end of each log file 114 may be stored in a control structure, such as the log file control block 115. The log file control block 115 may be stored by the initialization function 152 upon initialization. The administrative thread 134, as described below, may maintain the array by adding and deleting log files based on demand.

At 308, the initialization function 152 may set an initial value of the log file pointer 135. The log file pointer 135 may point to an indication of the current log file 114, for example, at the log file control block 115. As described herein below, the administrative thread 134 may generate new log files 114 based on the value of the pointer 135. For example, as the set 113 of log files 114 is linked, the current position of the pointer 135, in conjunction with the log file control block 115, may provide an indication of how many log files 114 remain and, therefore, how many new log files 114 are required. It will be appreciated that the functionality of the log file pointer 135 may be implemented utilizing any suitable control mechanism. For example, in some embodiments, the log file pointer 135 may be implemented as a counter. The counter may be incremented and/or decremented (e.g., by the logging function 150) when a log file 114 is filled. The value of the counter may indicate the number of log files 114 used and, therefore, also the number of log files to be prepared.

The administrative thread 134, as described below, may utilize the log file pointer 135 to determine a number of required log files 114. For example, the value of the log file pointer 135, in conjunction with the linked list of log files 114 at the log file control block 115, may indicate to the administrative thread 134 how many previously-prepared log files 114 are available to be filled. If insufficient available log files 114 exist, the administrative thread 134 may prepare additional log files 114, and add indication of the prepared log files 114 to the log file control block 115. If the counter 135 is still not equal to zero, the administrative thread 134 may continue to execute until it is.

Figure 4:
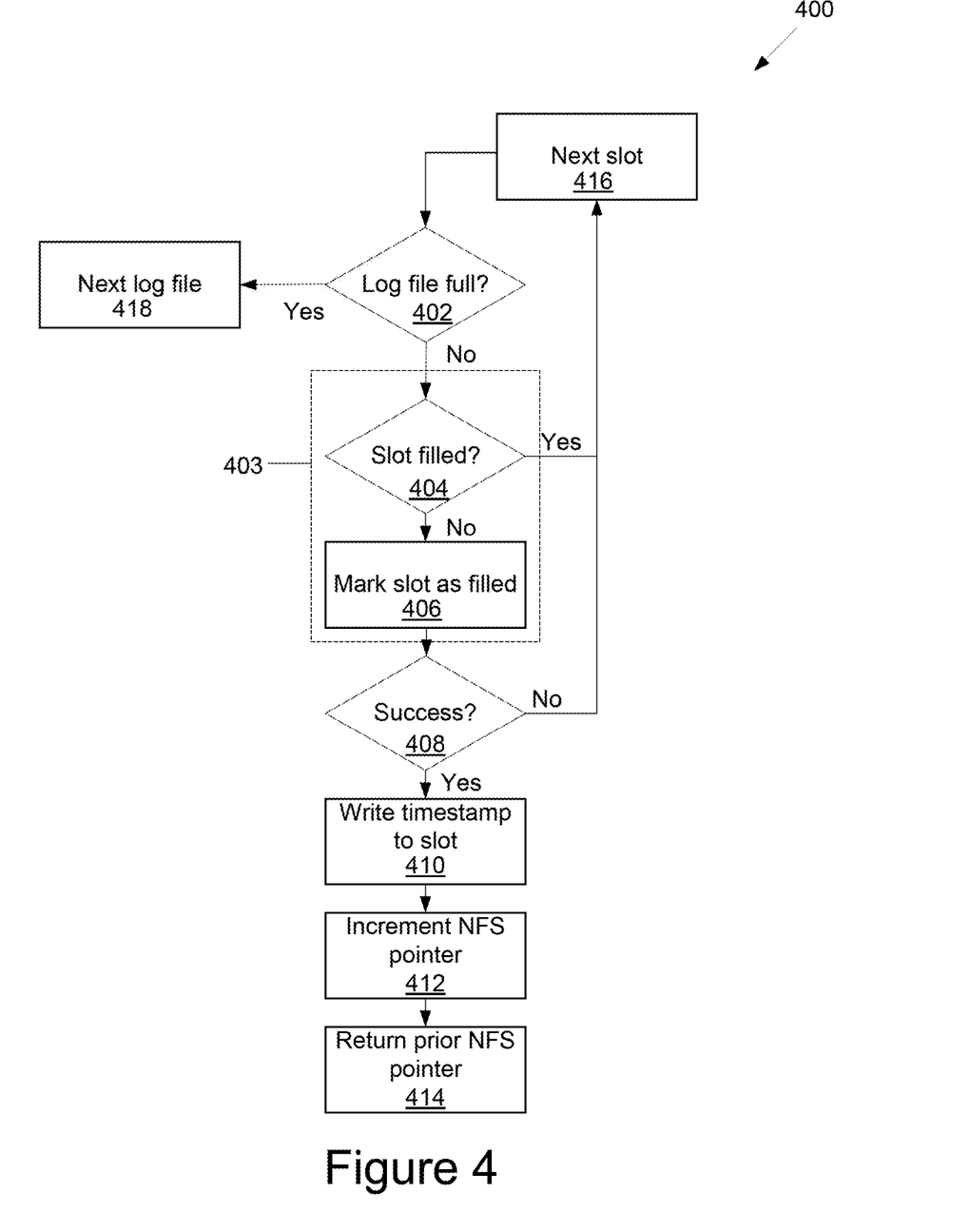
FIG. 4 is a flow chart illustrating one embodiment of a process flow that may be executed by the logging function to reserve a data slot for a thread.

FIG. 4 is a flow chart illustrating one embodiment of a process flow 400 that may be executed by the logging function 150 to reserve a data slot 144 for a thread 124. At 402, the logging function 150 may determine whether the current log file 114 pointed to by the next free data slot pointer 133 is full. For example, the logging function 150 may retrieve the next free data slot pointer 133. In some embodiments, the value of the next free data slot pointer 133 indicates when the last data slot 144 of a log file 114 is filled. For example, if the value of the pointer 133 points to an area of memory that is invalid (e.g., the pointer 133 is greater than or less than the value of the last data slot 14 of the log file 114), it may indicate that the current log file 114 is full. If the current log file 114 is full, the logging function may increment to the next log file 114 in the set 113 of linked log files at 418, for example, by referring to the array of log files generated by the initialization function 152 and/or updated by the administrative thread 134.

Figure 5:
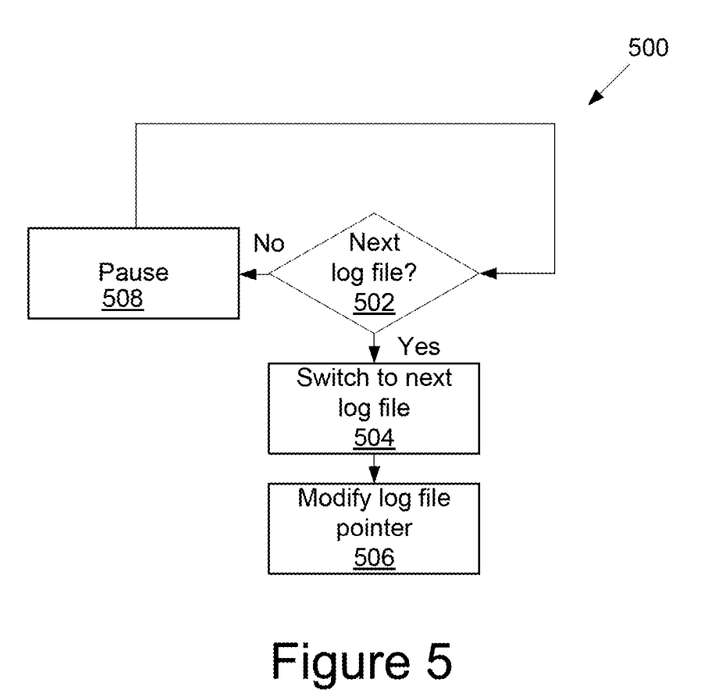
FIG. 5 is a flow chart illustrating one embodiment of a process flow that may be executed by an instance of the logging function to increment to a next log file (e.g., from a filled log file to a log file with free space).

FIG. 5 is a flow chart illustrating one embodiment of a process flow 500 that may be executed by an instance of the logging function 150 to increment to a next log file 114 (e.g., from a filled log file 114 to a log file 114 with free space). For example, the process flow 500 may implement the action 418 of the process flow 400. At 502, the logging function 150 may determine whether a next log file 114 is prepared. For example, if all of the log files 114 in the set 113 of log files 114 are filled, then a next log file 114 may not be prepared. Typically, the administrative thread 134 would prepare new log files 114 when the existing log files are full, as described herein. A dearth of prepared log files 114 may occur, then, if the user threads 124 fill log files 114 faster than the administrative thread 134 prepares new. If this is the case, the logging file 150 may pause at 508 (e.g., for a predefined number of clock cycles). The pause at 508 may give the administrative thread 134 sufficient time to awaken and prepare new log files 114, as described herein below.

If a next log file 114 is prepared, the logging function 150 may switch to the next log file 114 at 504. Switching to the next log file may involve, for example, modifying the next free data slot pointer 133 to point to the first data slot 144 of the next log file 114. In various embodiments, as described above, the logging function 150 may access the next free data slot pointer 133 with an atomic operation. Accordingly, no other instances of the logging function 150 may modify the next free data slot pointer 133 until the logging function 150 either succeeds or fails in modifying it. Provided that the logging function 150 is successful in updating the next free data slot pointer 133 at 504, it may also modify the log file pointer 134. For example, if the written slot is the last available slot in a log file 114 the logging function 150 may modify the log file pointer 134 to point to the next log file 114 in the log file control block 115. This may indicate to the administrative thread 134 that an additional log file 114 is filled. In some embodiments, the updating of the next free data slot pointer 133 at 504 and/or the updating of the log file pointer 134 at 506 may be performed with an atomic operation such as, for example, an atomic compare and set (CAS) operation. For example, the value of the next free data slot pointer 133 may be compared to a value indicating the end of the log file. If the condition is true (e.g., the pointer 133 points to the end of the log file) then the pointer 133 may be set to a value indicating the first slot of the next sequential log file. Also, in some embodiments, 504 may be performed utilizing an atomic exchange or exchange pointer operation (e.g., after it is determined that the instant log file is filled).

Referring back to FIG. 4, the logging function 150 may determine, at 404, whether the data slot pointed to by the next free data slot pointer 133 is filled. If so, the logging function 150 may examine the next data slot in the log file 114 at 416. In some embodiments, the logging function 150 does not increment the next free data slot pointer 133 unless that instance of the logging function 150 has successfully reserved a data slot, as described below. If not, the logging function 150 may mark the data slot as filled at 406. Marking the data slot as filled may comprise, for example, writing an indication to a status field 136 of the data slot 144. In various embodiments, the actions 404 and 406 may be performed concurrently as an atomic function 403. For example, the comparison may be between a value at the status field 136 of the data slot 144 and a known status value. The known status value may either be a status value indicating that the data slot 144 is filled or a status value indicating that the data slot 144 is free. The set may occur if the compare indicates that the data slot is free (e.g., the known status value indicates a free data slot and matches the value of the status field 136 or the known status value indicates a filled data slot and does not match the value of the status field 136). If the data slot 144 is free, the set may write to the status field 136 an indication that the data slot 144 is now filled. The compare and set function (or other atomic operation) may be performed, for example, by the processor executing the calling thread 124 without interruption from other threads 124. In other words, the processor may not execute instructions from any other threads, including other user threads 124, until the atomic operation either succeeds (reserving the data slot) or fails (indicating that another user thread 124 has previously reserved the data slot). This may serve to prevent more than one thread from reserving the same data slot 144. The atomic operation may be implemented in any suitable manner. For example, some processors support machine-level atomic operations that can be called by certain compilers. The logging function 150 may be implemented on a processor 104 that supports atomic operations. Also, for example, some compilers support hardware-agnostic atomic operations. A non-limiting example compiler supporting atomic operations include, for example the GNU Compiler Collection (GCC). Atomic operations may also be present in the APACHE PORTABLE RUNTIME library.

If the atomic operation is unsuccessful, at 408, it may indicate that another instance of the logging function 150 has already reserved the data slot pointed to by the next free data slot pointer 133. In this case, the logging function 150 may increment to the next data slot 144 in the log file at 416 but may not increment the next free data slot pointer 133. If the atomic CAS function is successful at 408, it may indicate that the data slot pointed to by the next free data slot pointer 133 is empty and has been marked as filled and/or reserved for the calling thread 124. Optionally, the logging function 150 may write a timestamp to the data slot at 410. At 412, the logging function 150 may increment the next free data slot 135 pointer so that it points to a next data slot 144 of the log file 114. Accordingly, when the next instance of the logging function 150 examines the next free data slot pointer 133, it may point to the next data slot in the log file 114 and not to the data slot 144 previously marked as reserved. At 414, the logging function may return to the calling thread 124 a pointer to the newly reserved data slot (e.g., a data slot payload location) as a reserved data slot pointer. In some embodiments, the logging function may also mark a timestamp to the reserved data slot. The time stamp may indicate the time that the slot was reserved. In example embodiments where the thread 124 writes to the reserved slot soon after its reservation, the time stamp may also provide a good indication of when the slot was filled by the thread 124. In some example embodiment, the thread 124 may time stamp the reserved slot in addition to or instead of the time stamping by the logging function at the time of reservation.

Figure 6:
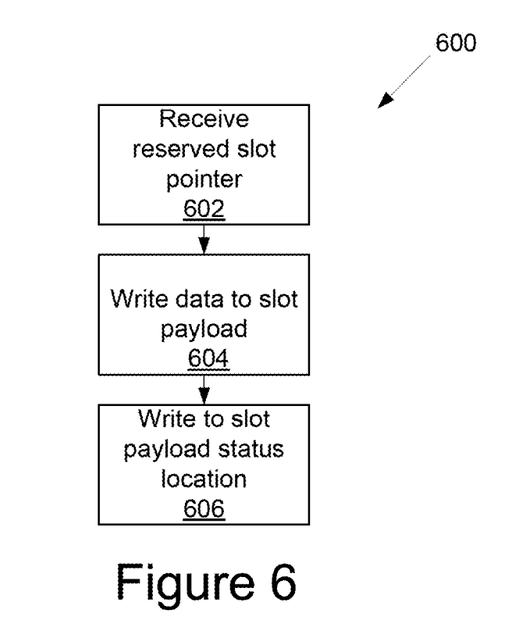
FIG. 6 is a flow chart illustrating one embodiment of a process flow that may be implemented to utilize a reserved data slot pointer to write data to a log file.

FIG. 6 is a flow chart illustrating one embodiment of a process flow 600 that may be implemented to utilize a reserved data slot pointer to write data 130 to a log file 114. In some embodiments, the process flow 600 is executed by a calling thread 124 after receiving a reserved data slot pointer. In other embodiments, the process flow 600 may be executed by the logging function 150. For example, the logging function 150 may receive as an argument a pointer to the data 130 to be logged. Referring to the process flow 600, the reserved data slot pointer may be received at 602. At 604, data (e.g., the data 130) may be written to the reserved data slot referenced by the reserved data slot pointer. At 606, a data slot payload status field of the reserved data slot may be modified to indicate that the data slot has been written. In some embodiments, some or all of the data slots 144 of the log files 114 comprise a payload status field for indicating whether the calling thread 124 (and/or logging function 150) has completed writing to the data slot 144. The payload status fields of various data slots 144 may be checked by the administrative thread 134, for example, prior to saving log files 114 to persistent data storage. For example, if a data slot 144 has been reserved to a thread 124, but the thread 124 has not yet written to the data slot 144, it may adversely affect the execution of the thread 124 to remove the data slot 144 from memory 103.

Figure 7:
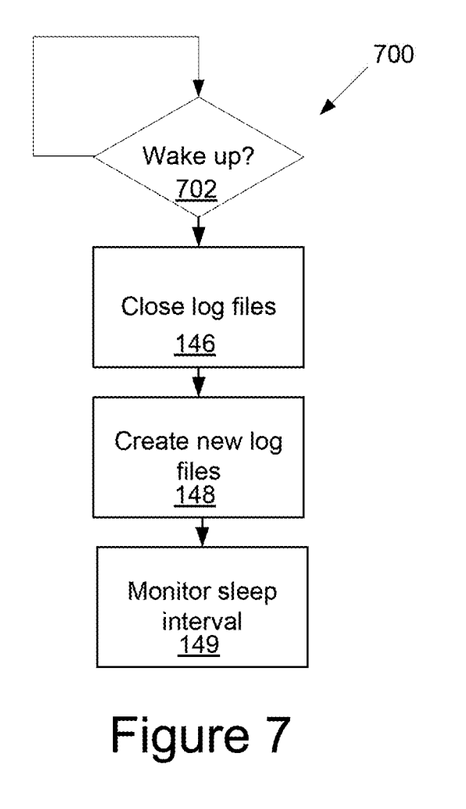
FIG. 7 is a flow chart illustrating one embodiment of a process flow that may be executed by the administrative thread to manage log files.

FIG. 7 is a flow chart illustrating one embodiment of a process flow 700 that may be executed by the administrative thread 134 to manage log files 114. At 702, the administrative thread 134 may activate, or "wake up." The thread 134 may be configured to activate according to a defined and/or variable interval, referred to herein as a sleep interval. The interval can be defined in any suitable increment including, for example, clock cycles, time, etc. At 146, the administrative thread 134 may close filled log files 114 stored at memory 103. Closing the files may cause the kernel asynchronous input/output (KAIO) to subsequently save the closed log files 114 to persistent memory 108. In some embodiments, the administrative thread 134 itself may store log files 114 to persistent memory. In some embodiments, the administrative thread 134 may review a log file 114 prior to closing to determine whether all data slots 144 of the log file have been written. If one or more data slots 144 have not been written, the administrative thread 134 may not save the log file 114 and/or may save a copy of the log file 114 but also leave a copy at the memory 103. For example, if one or more data slots 144 have not been written, one or more user threads 124 may expect to find the data slots 144 in memory 103 for subsequent writing.

At 148, the administrative thread 134 may prepare new log files 114. Preparing new log files 114 may comprise preparing new memory maps to log file locations at memory 103 and updating whatever mechanism is used to link successive log files 114. The administrative thread 134 may determine whether to prepare new log files 114 and how many new log files 114 to prepare, for example, based on the number of log files 114 that have been filled since the previous activation of the thread 134. The administrative thread 134 may determine the number of log files 114 that have been filled since its previous activation by referring to the log file pointer 135 and/or the log file control block 115. At 149, the administrative thread 134 may monitor and potentially modify its sleep interval. For example, the administrative thread 134 may set its sleep interval based on the number of log files 114 closed (at 146) and/or prepared (at 148). For example, if the number of log files 114 closed and/or prepared is within a given range, the sleep interval may be maintained. If the number of log files 114 to be closed or prepared is greater than a threshold, the previous sleep interval may be maintained. Also, for example, if the number of log files 114 to be saved or prepared is less than a given threshold, the sleep interval may be increased. In some embodiments, changes to the sleep interval are determined over the course of multiple executions of the administrative thread 134. For example, a determination whether to adjust the sleep interval may be determined based on an average number of log files 114 saved and/or prepared, or other suitable aggregation, taken across multiple executions of the thread 134.

In some embodiments, if the administrative thread 134 awakens at 702 and determines that no log files 114 need to be closed and/or prepared, the administrative thread 134 may make no changes to its sleep interval. If log files 114 do need to be prepared, the administrative thread 134 may decrement its sleep interval (e.g., by ⅕ of a user-supplied sleep value) so as to increase the frequency of operation of the administrative thread 134. When the thread 134 later experiences an iteration where there is no work to do (e.g., no log files 114 to prepare) then it may increase its sleep interval (e.g., by ⅕ of the supplied value per zero duty cycle) until a default and/or user supplied value is reached. This exponential back-off may enable the system to quickly respond to peak logging activity whilst gradually decreasing system load automatically.

In some embodiments, the administrative thread 134 may be configured to modify its own operation parameters in response to the execution environment. For example, the administrative thread 134 may adjust based on the rate at which log files are being filled. If log files are being filled at too high a rate, the administrative thread 134 may increase the number of log files 114 prepared at any one time and/or may shorten the interval between its own activations (e.g., see 702). If log files are being filled at too low a rate, the administrative thread 134 may decrease the number of log files 114 prepared at any one time and/or may lengthen the interval between its own activations. Also, in some embodiments, the functionality of the initiation function 152 and the administrative thread 134 may be merged. For example, the process flow 300 (e.g., with the exception of action 302) may be executed by the administrative thread 134 upon its first execution.

As mentioned above, various conditional actions of the process flows 300, 400, 500, 600, 700 may be implemented utilizing buitin_expect( ) operations, e.g., builtin_expect( ). For example, referring to the process flow 400, conditional actions 402, 404 and/or 408 may be implemented as buitin_expect( ) operations. Regarding 402, the log file 114 may have a large number of data slots 144 compared to the number of user threads 124 writing to it. Accordingly, any particular instance of the logging function 150 is unlikely to find that a log file 114 is full. Accordingly, the action 402 may be implemented as a buitin_expect( ) operation biased towards finding that the log file 114 is not full. Referring to 404 and/or 408, a data slot 144 pointed to by the next free data slot pointer 133 may be filled only when the logging function 150 checks the data slot status after another instance of the logging function 150 has reserved the data slot but before that other instance of the logging function has incremented the next free data slot pointer 133. As this may be a relatively uncommon event, the actions 404 and/or 408 may be implemented as buitin_expect( ) operations biased toward finding that the identified data slot 144 is not filled. Referring now to the process flow 500, conditional action 502 may be implemented as a buitin_expect( ) operation. For example, it may be assumed that situations where no next log file 114 is prepared are relatively rare. Accordingly, the action 502 may be implemented as a buitin_expect( ) operation biased towards finding that a next log file 114 does exist.

It will be appreciated that the atomic and buitin_expect( ) operations may be implemented in any suitable programming language utilizing any suitable compiler. In some embodiments, the operations are implemented utilizing the C programming language configured for use with any suitable compiler including, for example, the GNU COMPILER COLLECTION (GCC) in conjunction with the APACHE PORTIBILE RUNTIME library. For example, a buitin_expect( ) operation may be coded as indicated by Code Example 1 below:

---

CODE EXAMPLE 1:

```
if(__builtin__expect(A, B)){
    C
} else {
    D
}
```

---

In Code Example 1, A represents a condition (e.g., a slot is full, a log file is full, etc.). B represents a buitin_expect( )ed value for the condition A (e.g., true or false). C represents a conditional branch to be executed if the condition A is true. D represents a conditional branch to be executed if the condition is false.

An atomic operation may be coded as indicated by Code Example 2 below:

CODE EXAMPLE 2:

apr_atomic_cas32(X,Y,Z)

Code Example 2 demonstrates an atomic compare and set (CAS) operation. X is a pointer to the value to be compared (e.g., a status field of a data slot). Y is an indication of what the value should be set to if the operation succeeds (e.g., an indication that the data slot is full). Z is what the value should be compared to in determining whether the CAS operation succeeds (e.g., an indication that the data slot is free).

In some embodiments, buitin_expect( ) and atomic CAS operations may be utilized together. For example, Code Example 3 shows coding according to one example embodiment for implementing the atomic CAS operation 403 described herein above:

CODE EXAMPLE 3:

if (__builtin_expect(apr_atomic_cas32(X,Y. X)))

In Code Example 3, the condition of the buitin_expect( ) operation is set equal to the CAS operation. That is, if the CAS operation succeeds, the condition is true whereas if the CAS operation fails, the condition is false. The buitin_expect( ) value for the condition is indicated to be 1 or "true." That is, it may be expected that the next data slot will be free. C and D may represent the conditional branches. For example, according to C, the logging function may increment the next free slot pointer and/or timestamp the slot. According to D, the logging function may continue to the next sequential slot, return a failure message, etc.

Code Example 4 below shows code according to one example embodiment implementing another atomic operation for exchanging pointer values:

CODE EXAMPLE 3:

apr_atomic_atomic_xchgptr(A1,A2)

In Code Example 4, A1 indicates a pointer to the pointer to be exchanged and A2 indicates a value that the pointer will be updated to be. An exchange pointer atomic operation, such as the one shown in Code Example 3, may be utilized, for example, to implement the action 504 described above.

Figure 8:
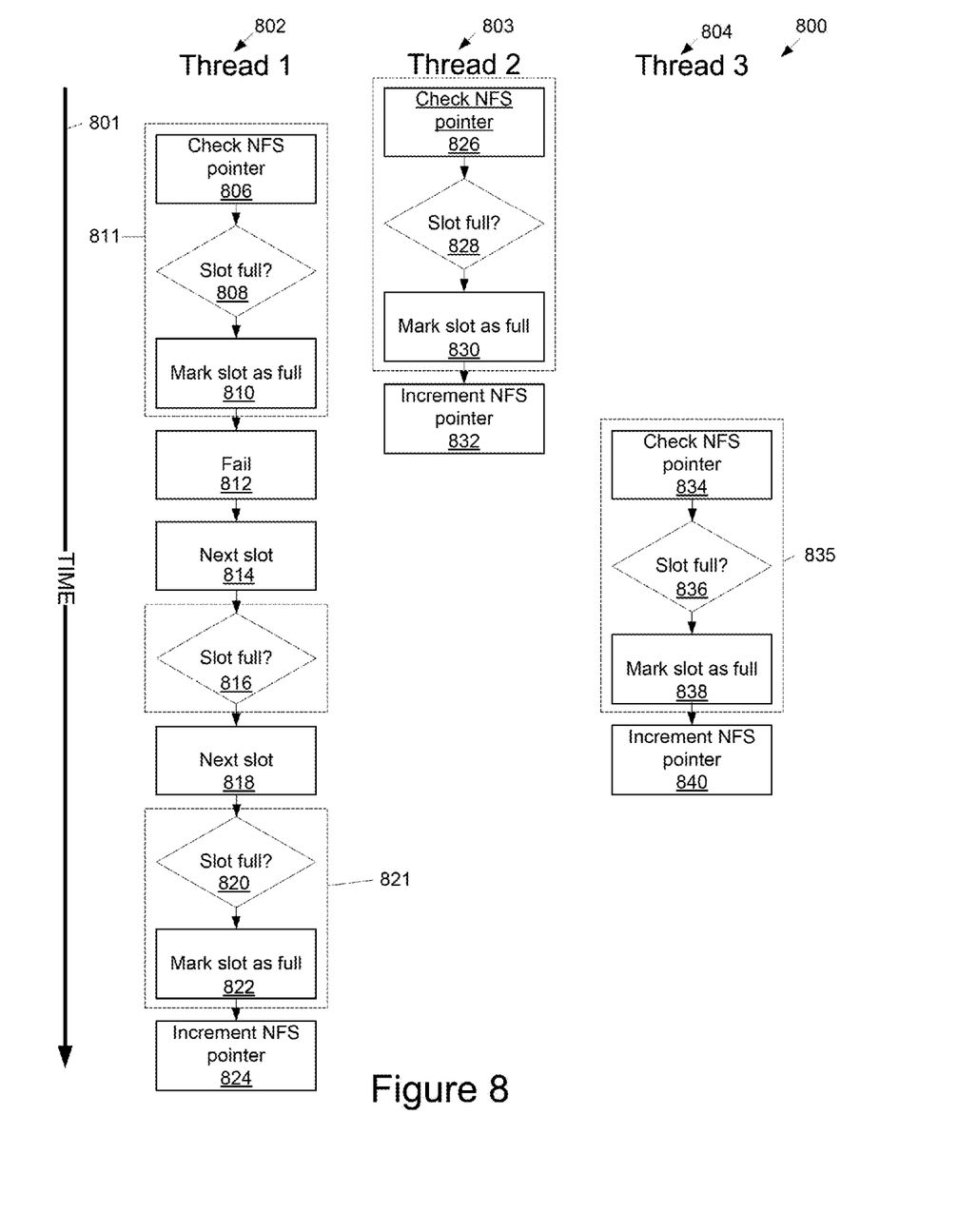
FIG. 8 is a flow chart showing one embodiment of an example work flow implemented by three instances of the logging function (e.g., called by three different threads).

The process 400 described herein by which the logging function 150 may reserve a data slot 144 may effectively handle a situation where multiple threads 124 call multiple instances of the logging function 150 to reserve data slots at nearly the same time. FIG. 8 is a flow chart showing one embodiment of an example work flow 800 implemented by three instances of the logging function 150 (e.g., called by three different threads). Columns 802, 803, 804 represent the three different threads. The actions under each of the respective columns 802, 803, 804 may be performed by the threads themselves and/or by instances of the logging function 150 called by the respective threads. In FIG. 8, time is indicated by arrow 801. The example work flow 800 assumes that at least three data slots 144 are free in the current log file 114. Accordingly, the action 402 of the process flow 400 implemented by the threads 802, 803, 804 are not shown in FIG. 8.

First in FIG. 8, thread 803 checks the next free data slot pointer 133 at 826. Assuming for the example shown in FIG. 8 that the data slot pointed to by the pointer 133 (a first data slot) is not full (828), the thread 803 may mark the data slot as full (830) and increment the next free data slot pointer (832). As described above, the actions 826, 828 and 830 may be implemented together as a single atomic operation 827. The thread 802 may similarly check the next free data slot pointer 133 (806), determine if the first data slot is full (808) and attempt to mark the first data slot as full (810). Again these operations may be executed as a single atomic operation 811. As the thread 802 attempts to mark the first data slot as full at 810 after the thread 803 has marked the first data slot as full at 830, the attempt may fail at 812 (e.g., the atomic operation 811 may fail).

Referring now to the thread 804, it may check the next free data slot pointer 133, determine if the pointed-to data slot is full 836, and mark the next data slot as full 836, again as part of a single atomic operation 835. Because the operation 835 occurs after the thread 803 increments the next free data slot pointer 133, the next free data slot pointer 133 may point to a second data slot that is logically positioned after the first data slot. After marking the second data slot as full at 838, the thread 804 may increment the NFS pointer at 840 to pointer to a third data slot.

Referring back to the thread 802, after the operation 811 fails, the thread 802 advances to the next data slot at 814. The next data slot relative to the thread 802 may be the second data slot referenced above. At 816, the thread 802 may determine whether the second data slot is full. In various embodiments, the action 816 is implemented as an atomic operation. In the example shown in FIG. 8, the thread 804 has marked the second data slot as full before the action 816. Accordingly, the action 816 fails. The thread 802 examines the next data slot logically positioned after the second data slot (e.g., the third data slot) at 818. In another atomic operation 821, the thread 802 checks whether the third data slot is filled (820) and marks the third data slot as full (822). In the example of FIG. 8, the third data slot is not yet filled, so the operation 821 is successful. Accordingly, the thread 802 may increment the next free data slot pointer at 824. As the next data slot pointer 133 was previously incremented to point to the second data slot at 832 and to point to the third data slot at 840, the incrementing by the first thread 802 at 824 may cause the next free data slot pointer 133 to point to a fourth data slot.

Various embodiments of computer-based systems and methods of the present invention are described herein. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that successful a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, application specific integrated circuit (ASIC) or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), solid state disk (SSD), static random access memory (SRAM) used in conjunction with a field programmable gate array (FPGA), and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. For example, any of the computers or related devices described herein may be implemented as a system on a chip (SoC) that may include components such as an FPGA, a CPU, SRAM, SSED, etc. on a single card or chip. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

I claim:

1. A computer implemented system for maintaining logs for use by multiple threads, the system comprising:
   a computer system, the computer system comprising at least one processor and operatively associated memory, wherein the memory comprises:
      a plurality of log files, wherein each log file of the plurality of log files comprises a plurality of data slots and wherein each of the plurality of data slots are of a common size; and
      a next free data slot pointer;
   wherein the computer system is programmed to execute a plurality of threads;
   wherein the computer system is programmed to reserve a data slot for a first thread selected from the plurality of threads, wherein reserving the data slot for the first thread comprises:
      attempting to perform a first atomic operation to write to a first data slot pointed to by a current value of the next free data slot pointer an indication that the first data slot is filled; and
      performing one of the following disjunctive steps based on whether the first atomic operation is successful:
         conditioned upon success of the first atomic operation, updating the next free data slot pointer to point to a second data slot positioned sequentially after the first data slot; and
         conditioned upon failure of the first atomic operation, analyzing the second data slot.

2. The system of claim 1, wherein the first atomic operation is a compare and set operation, and wherein the compare comprises comparing a value of a status field of the first data slot to a known status value, and wherein the set comprise the writing to the first data slot the indication that the first data slot is filled.

3. The system of claim 2, wherein writing to the first data slot the indication that the first data slot is filled comprises writing the indication that the first data slot is filled to the status field of the first data slot.

4. The system of claim 1, wherein the computer system is further programmed to reserve a data slot for a second thread selected from the plurality of threads by the second thread, wherein reserving the data slot for the second thread selected from the plurality of threads comprises:
   attempting to perform a second atomic operation to write to the first data slot an indication that the first data slot is filled; and
   performing one of the following disjunctive steps based on whether the second atomic operation is successful:
      conditioned upon success of the second atomic operation, updating the next free data slot pointer to point to a second data slot positioned sequentially after the first data slot; and
      conditioned upon failure of the second atomic operation, determining whether the second data slot is free.

5. The system of claim 4, wherein the first atomic operation fails when the second atomic operation completes before the first atomic operation.

6. The system of claim 1, wherein analyzing the second data slot comprises:

attempting to perform a third atomic operation to write to the second data slot an indication that the second data slot is filled; and performing one of the following disjunctive steps based on whether the third atomic operation is successful:

conditioned upon success of the third atomic operation, updating the next free data slot pointer to point to a third data slot positioned sequentially after the second data slot; and conditioned upon failure of the third atomic operation, analyzing the third data slot.

7. The system of claim 1, wherein reserving the data slot for the first thread further comprises, conditioned upon success of the first atomic operation:

generating a reserved data slot pointer pointing to the first data slot; and providing the reserved data slot pointer to the first thread.

8. The system of claim 1, wherein the computer system is further programmed to, also conditioned upon success of the first atomic operation, write, by the first thread, to the first data slot.

9. The system of claim 1, wherein the first data slot is part of a first log file of the plurality of log files, and wherein reserving the data slot for the first thread further comprises:

conditioned upon the first log file being filled, updating the next free data slot pointer to point to a fourth data slot that is part of a second log file positioned sequentially after the first log file, wherein the updating is performed utilizing a fourth atomic operation.

10. The system of claim 9, wherein the memory further comprises a log file counter, wherein reserving the data slot for the first thread further comprises:

also conditioned upon the first log file being filled, updating a log file pointer.

11. The system of claim 9, wherein the plurality of threads comprises an administrative thread, and wherein the administrative thread is configured to:

periodically close at least one filled log file from the plurality of log files; and add at least one new log file to the plurality of log files to replace the at least one filled log file that was closed.

12. The system of claim 11, wherein adding the at least one new log file to the plurality of log files comprises memory mapping the at least one new log file to the memory.

13. The system of claim 1, wherein each of the plurality of data slots comprises a predefined number of data fields.

14. The system of claim 1, wherein the first atomic operation is also a buitin_expect( ) operation configured to expect that the first data slot is unfilled.

15. The system of claim 1, wherein the memory comprises kernel space and wherein the plurality of log files are positioned in the kernel space.

16. The system of claim 15, wherein the computer device is further configured to execute a kernel, and wherein the kernel is configured to write the set of log files to a persistent data storage device of the computer system upon a failure of the computer device.

17. The system of claim 1, wherein the plurality of log files are memory mapped to the kernel space.

18. The system of claim 1, wherein each of the plurality of log files is of a predefined size.

19. A computer implemented method for maintaining logs for use by multiple threads, the system comprising:

reserving a data slot for a first thread selected from a plurality of threads executed by a computer system, wherein the computer system comprises at least one processor and operatively associated memory, wherein the memory comprises a plurality of log files and a next free data slot pointer, wherein each log file of the plurality of log files comprises a plurality of data slots and wherein each of the plurality of data slots are of a common size, and wherein reserving the data slot for the first thread comprises:

attempting to perform a first atomic operation to write to a first data slot pointed to by a current value of the next free data slot pointer an indication that the first data slot is filled; and performing one of the following disjunctive steps based on whether the first atomic operation is successful:

conditioned upon success of the first atomic operation, updating the next free data slot pointer to point to a second data slot positioned sequentially after the first data slot; and conditioned upon failure of the first atomic operation, analyzing the second data slot.

20. The method of claim 19, wherein the memory comprises kernel space and wherein the plurality of log files are positioned in the kernel space.

* * * * *